March 30, 1965 L. C. WILCOX 3,175,646
JOINT FOR PISTON-PISTON ROD COMBINATION, AND
VALVE FUNCTION THEREOF
Filed April 29, 1963 2 Sheets-Sheet 1

INVENTOR.
LANCE C. WILCOX
BY
James and Franklin
ATTORNEYS

INVENTOR.
LANCE C. WILCOX
BY
James and Franklin
ATTORNEYS

United States Patent Office 3,175,646
Patented Mar. 30, 1965

3,175,646
JOINT FOR PISTON-PISTON ROD COMBINATION, AND VALVE FUNCTION THEREOF
Lance C. Wilcox, Wilton, Conn., assignor to Electric Regulator Corporation, Norwalk, Conn., a corporation of New York
Filed Apr. 29, 1963, Ser. No. 276,396
7 Claims. (Cl. 188—94)

The present invention relates to structure for connecting invention relates to structure for connecting a piston and a piston rod adapted to permit a degree of universal movement therebetween and to provide a valve action controlling the passage of fluid through the piston.

In many piston-cylinder assemblies it is desired that the piston rod which extends from the piston, and which is designed to transmit motion either to or from the piston, have a degree of pivotal movement relative to the piston. This is conventionally accomplished by connecting the piston rod to the piston by means of an ordinary pivot or hinge connection. While such conventional arrangements are more or less satisfactory in large installations, they are not sufficiently reliable in small installations, as where the piston-cylinder assembly functions as a damping dashpot for a sensitive electromagnetic assembly (see for example Cohen Patent 2,580,732 of January 1, 1952 entitled "Finger-Type Circuit Regulator"). In addition, such constructions add appreciably to the cost of manufacture of the assemblies, both with respect to the cost of the parts and the time involved in assembly of the parts.

Pivotal connections of the type above referred to require precise orientation of the piston relative to the external equipment to which it is connected, thus making installation difficult. Also, by reason of the fact that rotation of the piston within the cylinder is positively prevented, such connections inhibit accurate alignment of the piston relative to the cylinder in the event of vibration, shock or abuse of the equipment, thus making operation unreliable.

In addition, particularly when the cylinder-piston assembly is designed for damping purposes, different degrees of damping are often required upon movement of the piston in different directions. A convenient way to accomplish this result is to provide a fluid passage through the piston, and to utilize a fluid-pressure-actuated one-way valve in that passage to differentially control the flow of fluid therethrough. The provision of such a valve constitutes a significant source of expense. The lack of positive operation of such a valve is a source of trouble in operation.

The primary object of the present invention is to devise, in a piston-cylinder assembly, a novel mode of connection between the piston rod and the piston adapted to produce either or both of two desirable effects, to wit:

(1) Permit the piston rod a limited degree of universal movement relative to the piston without placing any strain on the piston itself. Hence the piston can slide within the cylinder in a free and uniform manner whether the piston rod is perpendicular thereto or inclined relative thereto, and without adversely affecting the normal seal between the piston and the cylinder or causing undue wear on the contacting piston-cylinder surface.

(2) Provide a structurally simple connection between the piston rod and piston which will provide for the transmission of movement from one to the other and which will at the same time function as a directional valve, permitting relatively free fluid flow through the piston upon movement of the piston-piston rod combination in one direction and relatively restricted fluid flow through the piston upon movement of the piston-piston rod combination in the other direction.

It is a further object of the present invention to achieve the above results by means of a structure the parts of which are simple and inexpensive, which need not be manufactured to any particularly close dimensional tolerances, and which are easily and inexpensively assembled.

In accordance with the present invention the piston is provided with an element defining a chamber, and the piston rod is provided at its end with an enlarged, and preferably ball-like, part received and retained in that chamber, and preferably relatively freely rotatable therein. The piston rod proper extends out from the chamber, preferably with an appreciable clearance therearound. With said preferred construction the piston rod is afforded at least a limited degree of universal movement relative to the piston without causing the piston to bind or cant within the cylinder.

In order to produce the desired directional valve action, the piston is provided with a fluid passage extending between said chamber and the end of the piston facing the cylinder cavity. The enlarged part of the piston rod has a limited degree of axial movement within the chamber, and may be urged by resilient means in one direction or the other within that chamber. When said enlarged part is at one limit of its movement within the chamber it makes a fluid-sealing engagement with an inner surface of the chamber, thereby preventing or inhibiting fluid flow through the piston. When said enlarged part moves away from this limit of movement, the flow of fluid through the piston passage and out of the chamber in which said enlarged part is received is permitted. Thus, when the assembly in question is used as a damping dashpot and the piston rod is urged in a direction such as to bring its enlarged part into sealing engagement with an inner surface of the chamber, movement of the piston in that direction is restricted and a high degree of damping occurs. When the piston rod is urged in the other direction the sealing action of the enlarged part is eliminated, fluid flows more or less freely through the piston, and a lesser degree of damping is achieved.

The element defining the chamber in which the end of the piston rod is received is preferably, although not necessarily, made separate from the piston, so that said element and the piston rod may be assembled conveniently and inexpensively, that element thereafter being secured to the piston in any appropriate manner.

To the accomplishment of the above, and to such other objects as may hereinafter appear, the present invention relates to a structure for connecting a piston rod to a piston, as defined in the appended claims and as described in this specification, taken together with the accompanying drawings, in which:

Figure 2:
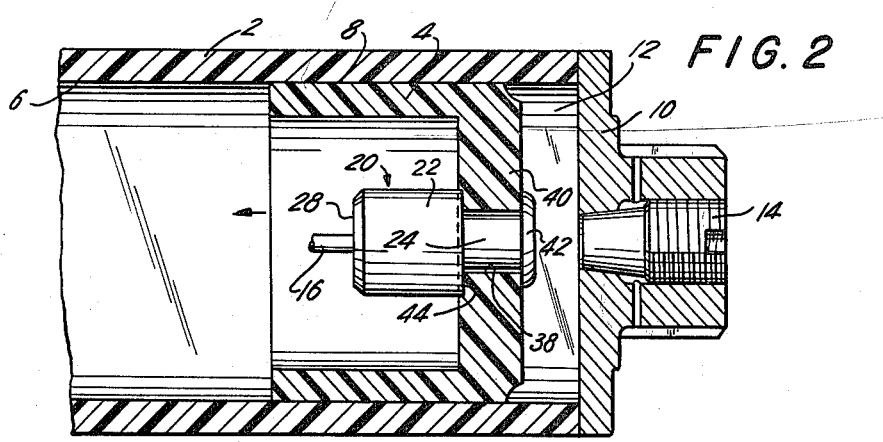
FIG. 2 is a cross sectional view of a generalized piston-cylinder combination in which the assembly of FIG. 1 is secured to the piston.

There is disclosed in FIG. 2 a cylinder 2 within which piston 4 is slidably mounted, a fluid seal being achieved between the inner surface 6 of the cylinder 2 and the outer surface 8 of the piston 4. The cylinder is provided with an end wall 10, a cavity 12 being defined between the end wall 10 and the piston 4. A valve 14 is mounted in any appropriate manner in the cylinder end wall 10 so as to control the flow of fluid into and out of the cylinder cavity 12 in any appropriate manner.

Figure 1:
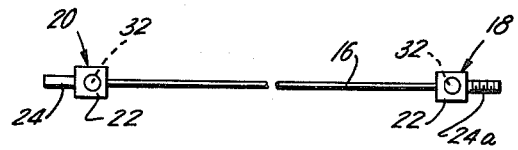
FIG. 1 is a side elevational view of an assembly of a piston rod and an element adapted to be attached to a piston, made in accordance with the present invention.

A piston rod 16 is adapted to be connected to the piston 4 for movement therewith. When the assembly is designed for use as a damping dashpot, the piston rod 16 is connected at its outer end to the moving parts the movement which is to be damped, as by means of the assembly 18, and is connected to the piston 4 by means of the assembly generally designated 20 (see FIG. 1).

The assembly 20 comprises an element having a body 22 and an axially extending portion 24, the body 22 having a chamber 26 formed therein which opens onto the body end 28. The end of the piston rod 16 is provided with an enlarged, and preferably ball-shaped, part 32 which is receivable within the chamber 26 with clearance therearound as indicated at 30, the ball-shaped part 32 therefore being rotatable within the chamber 26. Means generally designated 34 are provided for retaining the ball-like part 32 in the chamber 26, said retainer means having an aperture 36 therethrough, the piston rod proper 16 extending out through that opening 36 with appreciable lateral clearance therearound. As a result the piston rod 16 is operatively connected to the assembly 20 in motion- and force-transmissive relationship.

The piston (see FIG. 2) is provided with an aperture 38 in its front wall 40, through which the extending portion 24 of the assembly 20 passes, the assembly 20 being secured to the piston 4 in any appropriate manner by means of the extending portion 24. In the specific embodiments of FIGS. 2–5 the extending portion 24, which passes through the piston aperture 38, is adapted to be spun over, at 42, in order to secure the assembly 20 in place on the piston 4, the body 22 being provided with a sharp edge 44 which is adapted to bite into the front wall 40 of the piston 4, thereby to reliably seal the assembly 20 to piston 4 and substantially or completely prevent the escape of fluid therebetween. Alternatively, as illustrated in FIG. 6, the extending portion 24a there shown may be externally threaded, in which case the aperture 38 through the piston front wall 40 will be correspondingly threaded, the assembly 20 being secured to the piston 4 by threaded engagement, with or without the addition of sealing compound as required in order to prevent leakage of fluid between the piston 4 and the assembly 20. The threaded extending portion 24a could, of course, be employed with any of the embodiments of FIGS. 3, 4 and 5.

Figure 3:
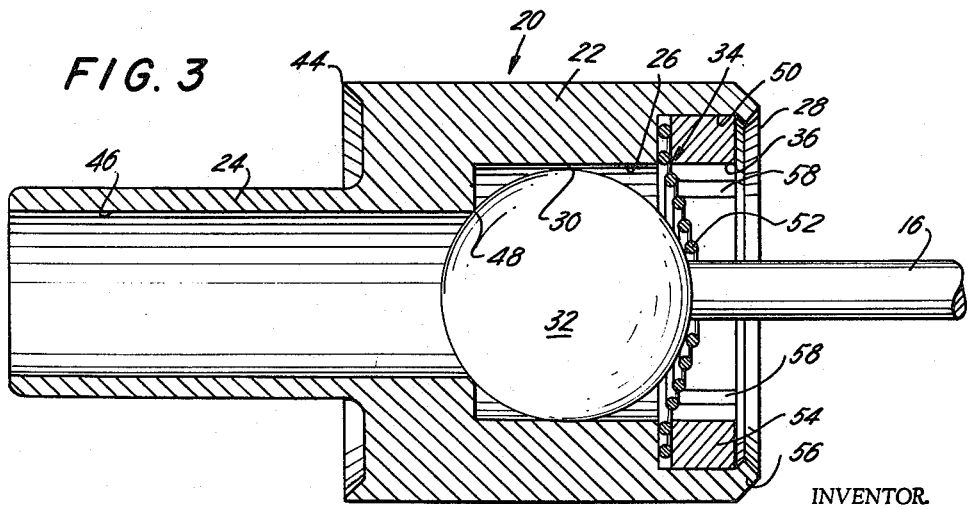
FIG. 3 is a cross sectional view, on an enlarged scale, of one embodiment of the generalized piston rod-element assembly of FIG. 1, which embodiment is designed to inhibit fluid flow through the piston when the piston rod pushes the piston and to facilitate fluid flow therethrough when the piston rod pulls the piston.

The embodiment of FIG. 3 is specially designed to provide, in addition to the universal connection between the piston 4 and the piston rod 16, a motion-sensitive valving action such that movement of the piston 4 within the cylinder 2 is strongly resisted when the piston 4 is pushed by the valve 16 and is less strongly resisted when the piston 4 is pulled by the rod 16. To that end the extending portion 24 is provided with a fluid passage 46 which extends between the chamber 26 and the cylinder cavity 12, that passage 46 terminating in a relatively sharp edge 48 against which the ball-like part 32 is adapted to seat when the rod 16 is pushed to the left as viewed in FIG. 3 (to the right as viewed in FIG. 2). The body 22 is provided, at the right hand end of the chamber 26 as viewed in FIG. 3, with a counter-bore 50 within which the outer turns of a spiral spring 52 are received, the body of that spring 52 engaging the ball-like part 32 and pressing it toward and into engagement with the edge 48. The spring 52 is retained within the counter-bore 50 by means of retainer ring 54, the end 56 of the body 22 being spun over the retainer ring 64 to hold the parts in position.

The ball-like part 32, together with the piston rod 16, may be formed of some relatively hard material such as stainless steel, while the assembly 20, and particularly the edge 48 thereof, may be formed of some softer material. The spring 52, in urging the ball-like part 32 against the edge 48, causes sealing engagement between those parts, thus closing off the passage 46 and preventing the flow of fluid therethrough. When the rod 16 is pushed the seal thus produced is strengthened and made more effective. Rotational movement of the ball-like part 32 when seated on the edge 48, such as may be caused by tilting of the rod 16, will not destroy the seal, but instead will tend to produce a more extensive bearing surface by causing the softer edge 48 to wear somewhat into conformity with the shape of the part 32. Hence when the piston 20 is pushed fluid will not pass therethrough and a high degree of damping will result. When, however, the piston 32 is pulled it will tend to move to the right within the chamber 26 (as viewed in FIG. 3), against the action of the spring 52, and fluid will then be able to flow through the clearance 30 around the part 32 and into and through the passage 46. As a result the piston 4 will move more readily, and a lowered degree of damping will result. The spring 52 acts to transmit the pulling force exerted on the rod 16 to the piston 4. If desired, the retaining ring 54 may be provided with inwardly extending fingers 58 which act as positive stops for movement of the ball-like part 32 to the right without preventing flow of fluid therearound.

Figure 4:
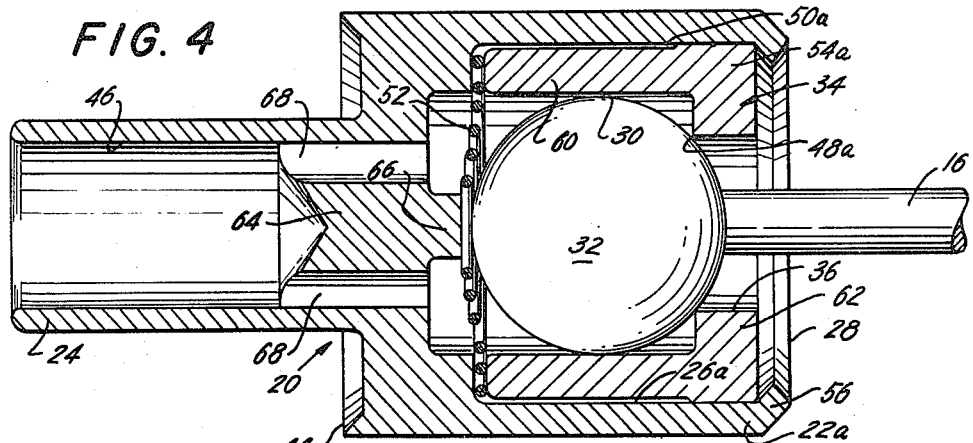
FIG. 4 is a view similar to FIG. 3 but showing an alternative embodiment in which the valving action is opposite to that of FIG. 3.

The embodiment of FIG. 4 is designed to produce a motion-sensitive valving action opposite to that of the embodiment of FIG. 3. To that end the counter-bore 50a is made considerably deeper, and the retaining ring 54a is provided with a skirt-like part 60 which extends between the ball-like part 32 and the inner surface of the chamber 26, the clearance 30 being defined between the ball-like part 32 and the skirt-like part 60. The spring 52 is active on the end of the ball-like part 32 opposite to that involved in the embodiment of FIG. 3, thereby tending to urge the ball-like part 32 to the right, into engagement with the edge 48a formed on the circumferentially continuous radially inwardly projecting lip 62 of the retainer ring 54a, the seal between the ball-like part 32 and the edge 48a being accomplished in substantially the same manner as in the embodiment of FIG. 3. In order to provide a positive stop for movement of the ball-like part 32 to the left as viewed in FIG. 4, the right hand end of the passage 46 carries a plug part 64 having a central stop protrusion 66 flanked by fluid passages 68.

With this embodiment, when the rod 16 is pushed to the left the ball 32 is moved to the left against the action of the spring 52 into engagement with the stop 66, fluid passes freely through the passages 46 and 68 and through the chamber 26 around the ball-like part 32, so that the piston 4 moves relatively freely. When the rod 16 is pulled to the right the ball 32 moves into sealing engagement with the edge 48a, closing off fluid flow through the piston, so that greater resistance is exerted against movement of the piston.

Figure 5:
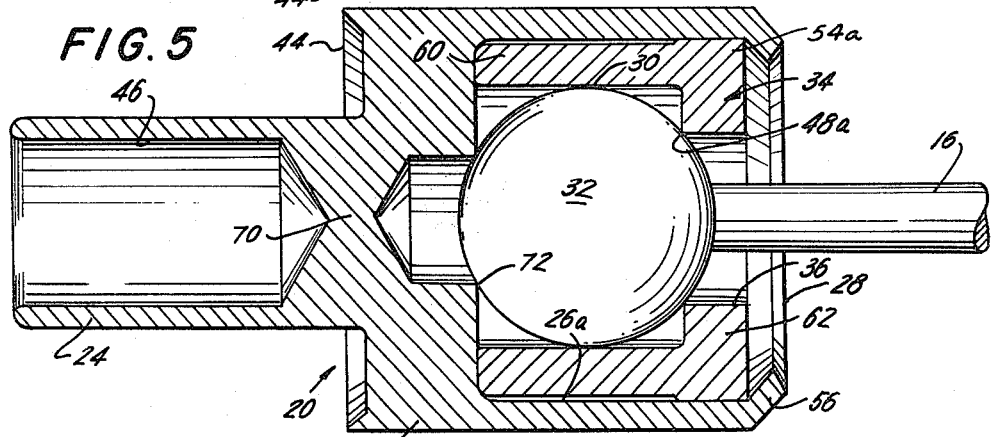
FIG. 5 is a view similar to FIG. 4, but disclosing an alternative embodiment in which no valving action is provided.
Figure 6:
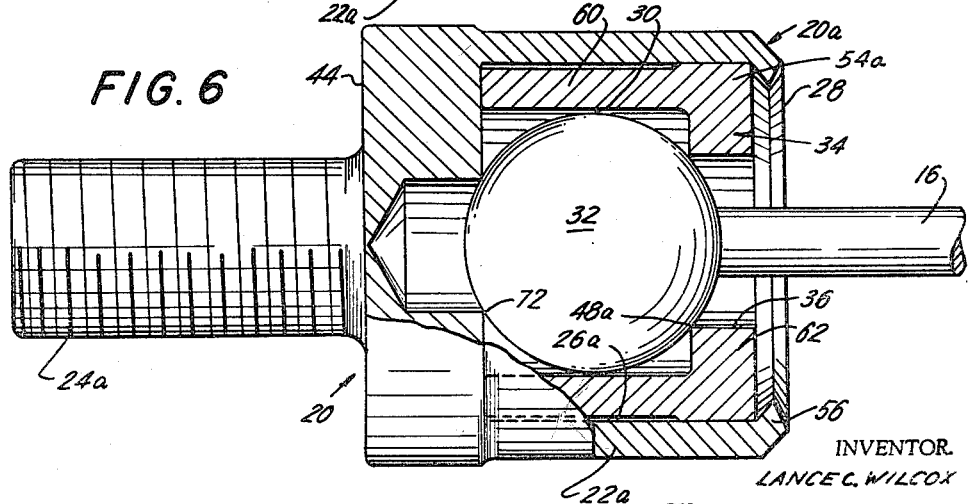
FIG. 6 is a view similar to FIG. 5 but showing a specifically different manner of mounting the element on the piston, which different manner of mounting could be employed with any of the embodiments of FIGS. 2–5.

In the embodiment of FIG. 5 no valving action is provided, that embodiment functioning solely to produce, in a simple and inexpensive manner, a mechanical connection between the rod 16 and the assembly 20 which permits the rod 16 at least a limited degree of universal movement. To that end the spring 52 of the embodiment of FIG. 4 is eliminated, the passage 46 is optionally completely closed off, as at 70, and the left hand end of the chamber 26 is provided with an edge 72 against which the ball-like part 32 is adapted to seat. Since no valving action is provided, it is not necessary that the ball-like part 32 have any axial freedom of movement within the chamber 26, the spinning over of the end 56 of the body 22 serving to cause engagement of the ball-like part 32 simultaneously with the edges 48a and 72. Thus the ball-like part 32 is firmly mechanically connected to the assembly 20, and through it to the piston 4, while at the same time the frictional resistance of the ball 22 to rotary movement within the chamber 26 is greatly minimized, thus facilitating the freedom of universal movement of the rod 16 relative to the piston 4.

The embodiment of FIG. 6 is substantially identical with that of FIG. 5, except that, as has previously been described, its extending portion 24a is externally threaded. The embodiment of FIG. 6 is therefore well adapted for the connection of the rod 16 to the external linkages which are to be controlled or moved. Hence FIG. 1 discloses a rod 16 having an assembly 20 at one end thereof which may be of any of the types shown in FIGS. 3–5, that assembly being adapted to be secured directly to the piston 4 as disclosed in FIG. 2, and having an assembly 18 at its other end which is similar to that of FIG. 6, thus facilitating attachment to the external linkages or mechanisms.

It will be apparent from the above that none of the parts of the assembly need be made to any particular close tolerances and that assembly of the parts is simple, rapid and inexpensive. The cooperation of the parts is such that when valving action is produced the greater the force exerted by the rod 16 when sealing or valve-closing action is desired, the more effective will be that sealing action. Misalignment of the rod 16, or any tilting thereof in accordance with the movement of the external linkage or mechanism to which it is connected, will not cause any appreciable tilting or misalignment of the piston 4 within the cylinder 2, nor will any strain be exerted on the external mechanism to which the rod 6 is connected.

Hence by means of simple and inexpensive structure an improved mechanical connection between piston rod and piston is achieved, better and more reliable operation of the piston-cylinder assembly results, and, where desired, one-way valving action is effectively incorporated into the piston-cylinder assembly.

While but a limited number of embodiments of the present invention are here specifically disclosed, it will be apparent that many variations may be made therein, all within the scope of the instant invention as defined in the following claims.

I claim:

1. A dashpot or the like comprising a cylinder and a piston assembly including a piston slidable in said cylinder, and a member operatively connected to said piston, extending from said piston at a given end thereof for movement therewith and extending freely from said cylinder for angular movement relative thereto; the improvement which comprises said piston assembly including an element having a chamber opening onto said given end of said piston, said member extending into said chamber and having a ball-like part rotatably received therein with air-flow clearance between itself and said chamber, and with substantially no lateral movement between itself and said chamber, said element comprising retainer means operatively associated with said ball-like part for retaining said part in said chamber, said retainer means having an aperture through which said member extends with lateral clearance therearound sufficient to permit said member a degree of universal movement relative to said element as it moves angularly relative to said cylinder.

2. The combination of claim 1, in which said retainer means has a top portion having said aperture therethrough, the axially inner surface of said top portion at said aperture being adapted to make sealing engagement with said ball-like part, said ball-like part having a limited degree of axial movement in said chamber, and resilient means active on said ball-like part and urging it toward and into sealing engagement with said surface, said piston assembly having a fluid passage communicating between said chamber and the end of said piston opposite from said given end.

3. The combination of claim 1, in which said retainer means has a top portion having said aperture therethrough, the axially inner surface of said top portion at said aperture being adapted to make sealing engagement with said ball-like part, said ball-like part having a limited degree of axial movement in said chamber, said piston assembly having a fluid passage communicating between said chamber and the end of said piston opposite from said given end.

4. The combination of claim 1, in which said retainer means has a skirt portion received between said ball-like part and parts of said element, thereby to define side walls of said chamber, and said retainer means having a top portion having said aperture therethrough, the axially inner surface of said top portion at said aperture being adapted to make sealing engagement with said ball-like part.

5. The combination of claim 1, in which said retainer means has a skirt portion received between said ball-like part and parts of said element, thereby to define side walls of said chamber, and said retainer means having a top portion having said aperture therethrough, the axially inner surface of said top portion at said aperture being adapted to make sealing engagement with said ball-like part, said ball-like part having a limited degree of axial movement in said chamber, and resilient means active on said ball-like part and urging it toward and into sealing engagement with said surface, said piston assembly having a fluid passage communicating between said chamber and the end of said piston opposite from said given end.

6. The combination of claim 1, in which said element, within said chamber, has a surface disposed adjacent an end of said ball-like part which is adapted to make sealing engagement with said ball-like part, said ball-like part having a limited degree of axial movement in said chamber, and resilient means active on said ball-like part and urging it toward and into sealing engagement with said surface, said piston assembly having a fluid passage communicating between said chamber and the interior of the cylinder cavity between said cylinder and said piston, said ball-like part and said surface, when sealingly engaged, preventing fluid flow between said chamber and the exterior thereof, said resilient means comprising said retainer means.

7. The combination of claim 1, in which said element, within said chamber, has a surface disposed adjacent an end of said ball-like part which is adapted to make sealing engagement with said ball-like part, said ball-like part having a limited degree of axial movement in said chamber, said piston assembly having a fluid passage communicating between said chamber and the interior of the cylinder cavity between said cylinder and said piston, said ball-like part and said surface, where sealingly engaged, preventing fluid flow between said chamber and the exterior thereof.

References Cited by the Examiner

UNITED STATES PATENTS

| | | | |
|---|---|---|---|
| 661,839 | 11/00 | Adams | 188—100 |
| 1,374,914 | 4/21 | Engel | 188—100 |
| 3,076,643 | 2/63 | Bittel | 188—100 |

ARTHUR L. LA POINT, *Primary Examiner.*